(12) United States Patent
Chen

(10) Patent No.: US 11,190,584 B2
(45) Date of Patent: Nov. 30, 2021

(54) METHOD AND DEVICE FOR ACQUIRING BIT TORRENT RESOURCE INFORMATION

(71) Applicant: WANGSU SCIENCE & TECHNOLOGY CO., LTD., Shanghai (CN)

(72) Inventor: Kailin Chen, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 202 days.

(21) Appl. No.: 16/617,358

(22) PCT Filed: Aug. 21, 2018

(86) PCT No.: PCT/CN2018/101518
§ 371 (c)(1),
(2) Date: Nov. 26, 2019

(87) PCT Pub. No.: WO2020/006822
PCT Pub. Date: Jan. 9, 2020

(65) Prior Publication Data
US 2021/0337018 A1    Oct. 28, 2021

(30) Foreign Application Priority Data
Jul. 3, 2018   (CN) .......................... 201810718327.0

(51) Int. Cl.
*H04L 29/08*    (2006.01)
(52) U.S. Cl.
CPC ........ *H04L 67/108* (2013.01); *H04L 67/1042* (2013.01); *H04L 67/1068* (2013.01); *H04L 67/1076* (2013.01)

(58) Field of Classification Search
CPC .......................................... H04L 67/104–1085
See application file for complete search history.

(56) References Cited

U.S. PATENT DOCUMENTS

| 2003/0182373 | A1 * | 9/2003 | Soto ......................... H04L 29/06 709/204 |
| 2008/0040445 | A1 * | 2/2008 | Sullivan ................ H04L 67/104 709/217 |

(Continued)

FOREIGN PATENT DOCUMENTS

| CN | 101588287 A | 11/2009 |
| CN | 101917488 A | 12/2010 |

(Continued)

OTHER PUBLICATIONS

The China National Intellectual Property Administration (CNIPA) The China Search Report for 201810718327.0 dated Feb. 3, 2020 25 Pages.

(Continued)

*Primary Examiner* — David R Lazaro
*Assistant Examiner* — Julian Chang

(57) ABSTRACT

A method and a device for acquiring bit torrent (BT) resource information are provided. When interacting with a peered terminal for exchanging the data of a BT resource, in the case that a local terminal does not have the metadata of the BT resource, the local terminal, after performing the BT protocol handshake, determines the number of data slices of the BT resource based on the bitmap A of the BT resource sent by the peered terminal, and then a NOT operation of the bitmap A is performed, and the bitmap B obtained through the NOT operation is fed back to the peered terminal to trigger the peered terminal to send an acquisition request to the local terminal for the data blocks of the BT resource.

17 Claims, 2 Drawing Sheets

(56) References Cited

U.S. PATENT DOCUMENTS

| | | | |
|---|---|---|---|
| 2009/0100128 A1* | 4/2009 | Czechowski, III | ........................... H04L 67/1076 709/203 |
| 2009/0182815 A1* | 7/2009 | Czechowski, III | ........................... H04L 67/1076 709/206 |
| 2009/0198825 A1* | 8/2009 | Miller | ................... H04L 67/104 709/230 |
| 2011/0060721 A1* | 3/2011 | Chalouhi | ............ H04L 67/1095 707/622 |
| 2011/0161313 A1* | 6/2011 | Gerber | .................... H04L 67/22 707/723 |
| 2012/0030303 A1* | 2/2012 | Souza | ..................... H04L 65/80 709/207 |
| 2012/0047202 A1* | 2/2012 | Van Ackere | ........ H04L 67/1063 709/203 |
| 2013/0104247 A1* | 4/2013 | Cakulev | ............ H04L 29/06863 726/29 |
| 2013/0204936 A1 | 8/2013 | El Khayat et al. | |
| 2013/0304816 A1* | 11/2013 | Reguna | ............... H04L 67/1095 709/204 |
| 2014/0115098 A1* | 4/2014 | Reich | ................. H04N 21/4334 709/217 |
| 2016/0026789 A1* | 1/2016 | Martini | ............... G06F 9/45558 718/1 |
| 2017/0063981 A1 | 3/2017 | Hyun et al. | |
| 2018/0300476 A1* | 10/2018 | Guillama | .............. G06F 21/554 |
| 2019/0014161 A1* | 1/2019 | Doar | ................ H04L 65/4023 |
| 2020/0366655 A1* | 11/2020 | Sun | ....................... H04L 9/0894 |

FOREIGN PATENT DOCUMENTS

| | | |
|---|---|---|
| CN | 102075561 A | 5/2011 |
| EP | 2216958 A1 | 8/2010 |
| WO | 2008017505 A1 | 2/2008 |

OTHER PUBLICATIONS

The World Intellectual Property Organization (WIPO) International Search Report and Written Opinion for PCT/CN2018/101518 dated Mar. 13, 2019 9 Pages.

Zhanming Wang, Research of BitTorrent's principle and algorithm and its performance optimization, China Excellent Master's Thesis Full-text Database, Information technology collection, Dec. 15, 2017, vol. 2.1.4. 67 pages.

\* cited by examiner

METHOD AND DEVICE FOR ACQUIRING BIT TORRENT RESOURCE INFORMATION

CROSS-REFERENCE TO RELATED APPLICATIONS

This application is a national phase entry under 35 U.S.C. § 371 of International Application No. PCT/CN2018/101518, filed on Aug. 21, 2018, which claims the priority and benefits of Chinese Patent Application Serial No. CN201810718327.0, filed with the State Intellectual Property Office of P. R. China on Jul. 3, 2018, the entire content of all of which is incorporated herein by reference.

FIELD OF THE DISCLOSURE

The present disclosure relates to the field of data transmission technology and, more particularly, relates to a method and device for acquiring bit torrent (BT) resource information.

BACKGROUND

The bit torrent (BT) protocol is a computer communication protocol widely used for BT resource sharing between BT client terminals (i.e., peers) in peer-to-peer networks. In the process of sharing BT resources with other peers, a BT client terminal needs to determine, according to the metadata of the BT resource (including the total size of the BT resource, the number of data slices of the BT resource, and the size of each data slice), how many data slices need to be requested from a peered terminal and how many data blocks that each data slice needs to be divided into for the request.

After a BT client terminal receives a BT resource acquisition request sent by a peer, when it is found that the local does not have the metadata of the corresponding BT resource, the metadata is then acquired mainly through the following two existing methods: first, the BT client terminal may retrieve a corresponding seed file from a local or remote seed library according to the "info hash" of the BT resource carried in the BT resource request, and then read the metadata of the BT resource contained in the seed file; second, after the BT client terminal completes the handshake with the peered terminal, a request for the metadata of the BT resource may be sent to the peered terminal or other peer that is sharing the metadata of the BT resource.

In the process of implementing the present disclosure, the inventor has found that the existing technology has at least the following problems.

If the seed file of a BT resource is not found in the local or remote seed library, the peered terminal or other peer does not support the BT protocol extension "ut_metadata", and the peered terminal or other peer does not respond to the request for the metadata, the BT client terminal may not be able to obtain the metadata of the BT resource, and thus the BT client terminal may be unable to respond to the request sent by the peered terminal or the other peer.

BRIEF SUMMARY OF THE DISCLOSURE

In order to solve the problems in the existing technology, embodiments of the present disclosure provide a method and device for acquiring bit torrent (BT) resource information. The technical solutions are as follows:

In a first aspect, a method for acquiring BT resource information is provided, the method including:

after performing a handshake with a peered terminal, receiving a bitmap A of the target BT resource sent by the peered terminal;

performing a NOT operation of the bitmap A, and feeding back a new bitmap B obtained through the NOT operation to the peered terminal;

receiving a data-block acquisition request of the target BT resource sent by the peered terminal; and predicting a size of the data slice of the target BT resource according to an offset amount in the data-block acquisition request.

Optionally, performing the NOT operation of the bitmap A, and feeding back the new bitmap B obtained through the NOT operation to the peered terminal include:

when a bitmap of the target BT resource is un-stored locally, performing the NOT operation of the bitmap A, and feeding back the new bitmap B obtained through the NOT operation to the peered terminal, otherwise feeding back the bitmap of the target BT resource that is stored locally to the peered terminal.

Optionally, feeding back the bitmap of the target BT resource that is stored locally to the peered terminal includes:

when the peered terminal does not store all the data slices of the target BT resource that is stored locally, feeding back the bitmap of the target BT resource that is stored locally to the peered terminal, otherwise performing the NOT operation of the bitmap A and feeding back the new bitmap B obtained through the NOT operation to the peered terminal.

Optionally, predicting the size of the data slice of the target BT resource according to the offset amount in the data-block acquisition request includes:

when the offset amount in the data-block acquisition request is greater than a known data-block offset amount of the target BT resource, updating the size of the data slice of the target BT resource according to the offset amount in the data-block acquisition request.

Optionally, after predicting the size of the data slice of the target BT resource according to the offset amount in the data-block acquisition request, the method further includes:

according to the bitmap A and the predicted size of the data slice of the target BT resource, acquiring data blocks of the target BT resource from the peered terminal.

Optionally, the method further includes:

by using a number of the data blocks in each data slice as a length of a first dimension, and a number of the data slices as a length of a second dimension, recording the storage condition of each data block of the local target BT resource in a form of a two-dimensional array.

Optionally, the method further includes:

when the predicted size of the data slice of the target BT resource increases, adding a new data group correspondingly to the end of the first dimension of the two-dimensional array.

Optionally, the method is implemented by a cache server.

Based on the method described above, when interacting with a peered terminal for exchanging the data of a BT resource, in the case that a local terminal does not have the metadata of the BT resource, the local terminal, after performing the BT protocol handshake, determines the number of data slices of the BT resource based on the bitmap A of the BT resource sent by the peered terminal, and then a NOT operation of the bitmap A is performed, and the bitmap B obtained through the NOT operation is fed back to the peered terminal to trigger the peered terminal to send an acquisition request to the local terminal for the data blocks of the BT resource. As such, the size of the data slice of the BT resource can be predicted according to the data-block acquisition request, such that the resource information of the BT resource can be obtained. Moreover, the local terminal may also download the data block of the BT resource from the peered terminal according to the obtained BT resource information.

In a second aspect, in order to implement the method described above, the embodiments of the present disclosure further provide a device for acquiring BT resource information. A computer program is executed on the device, and the computer program can implement the method of the above embodiments.

Optionally, the device is a cache server.

BRIEF DESCRIPTION OF THE DRAWINGS

In order to more clearly illustrate the technical solutions of the embodiments of the present disclosure, the drawings used for illustrating the embodiments will be briefly described below. It should be understood that the following drawings merely illustrate some embodiments of the present disclosure. For a person of ordinary skill in the art, other drawings can be obtained according to these drawings without creative efforts.

DETAILED DESCRIPTION

In order to make the objects, technical solutions and advantages of the present disclosure clearer, the embodiments of the present disclosure will be further described in detail below with reference to the accompanying drawings.

An embodiment of the present disclosure provides a method for acquiring bit torrent (BT) resource information, which may be applied to a BT system. The BT system may be oriented to the entire Internet, and a BT client terminal may be able to perform data transmission of a BT resource with other BT client terminals through BT protocols.

Before two BT client terminals transmit data to each other, the two BT client terminals may have the metadata (metadata) of the BT resource to be shared (may be a file or a collection of multiple files, which are collectively referred to as "shared files" hereinafter). Because the metadata provides resource information such as the total size (in bytes) of the BT resource, how many data slices are included, and the size of each data slice, etc. When a BT client terminal lacks these resource information, it may not know how many data slices it wants to request from the peered terminal, and how many data blocks that each data slice needs to be divided into for the request.

The method provided in the present embodiment may predict the resource information of the BT resource based on the bitmap and the data-block acquisition request of the BT resource provided by a peered terminal, such that in the case that the BT client terminal does not have the metadata of the BT resource, or cannot obtain the metadata of the BT resource in the normal manner, data transmission of the BT resource can still be performed with the peered terminal.

Figure 1:
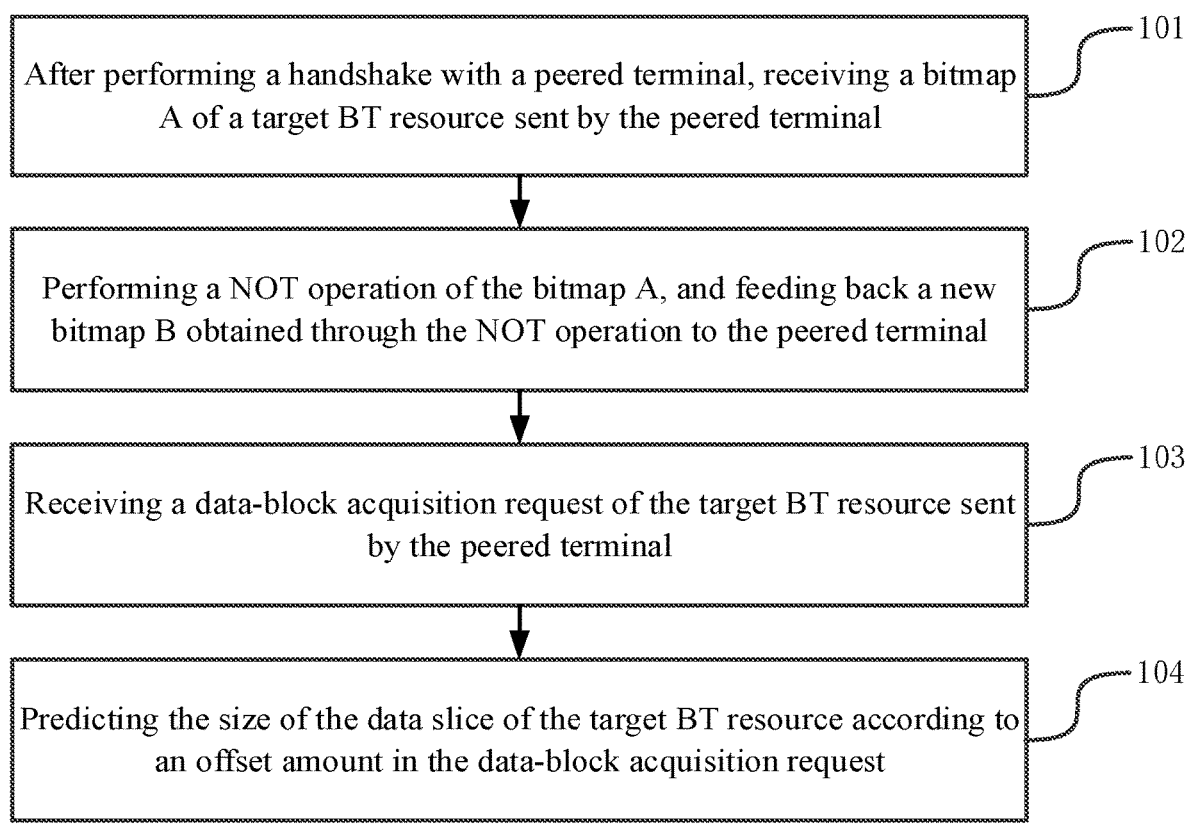
FIG. 1 illustrates a flowchart of a method for acquiring BT resource information according to an embodiment of the present disclosure.

In the following, the processing flow shown in FIG. 1 will be described in detail with reference to specific implementations, and the content may be as follows:

In step 101, after performing a handshake with a peered terminal, receiving a bitmap A of a target BT resource sent by the peered terminal.

In one embodiment, after receiving a data request for a BT resource (which may be referred to as a target BT resource) sent from a peer, the BT client terminal may first establish communication with the peer (which, in the following, may be referred to as a peered terminal), and then the two sides exchange the basic information of the data transmission through a handshake, including: the value of "info hash" of the target BT resource, the respective device ID, and other extension information (for example, whether the DHT mode is supported, whether the "ut_metadata" protocol extension is supported, etc.).

After performing a handshake with the peered terminal, the BT client terminal may first wait for the peered terminal to send the bitmap A of the target BT resource that is maintained by the peered terminal. The bitmap A may reflect the completion of the download of the data slice of the target BT resource in the peered terminal. Each binary bit in the bitmap (one byte contains 8 binary bits) indicates whether the data slice of the corresponding BT resource has been downloaded.

For example, the first digit of the bitmap A is 1, indicating that all the data blocks of the first data slice of the target BT resource in the peered terminal have been downloaded; the second digit of the bitmap A is 0, indicating that the second data slice of the target BT resource in the peered terminal has not been completely downloaded, that is, the peered terminal does not store any data slice or only stores a part of the second data slice. After obtaining the bitmap A of the target BT resource, the BT client terminal may determine the number of data slices included in the target BT resource according to the binary digits in the bitmap A.

In step 102, performing a NOT operation of the bitmap A, and feeding back a new bitmap B obtained through the NOT operation to the peered terminal.

In one embodiment, after obtaining the bitmap A of the target BT resource, the BT client terminal may perform NOT operation the bitmap A, that is, the binary digit value of 0 in the bitmap A may be changed to 1 and the binary digit value of 1 may be changed to 0, to obtain the new bitmap B. Then the BT client terminal may feed back the new bitmap B obtained through the NOT operation to the peered terminal.

Optionally, when the bitmap of the target BT resource is stored locally, the locally stored bitmap is preferentially fed back to the peered terminal. Correspondingly, the processing of step 102 may be as follows: when a bitmap of the target BT resource is un-stored locally, performing the NOT operation of the bitmap A, and feeding back the new bitmap B obtained through the NOT operation to the peered terminal, otherwise feeding back the bitmap of the target BT resource that is stored locally to the peered terminal.

In one embodiment, after obtaining the bitmap A of the target BT resource sent by the peered terminal, the BT client terminal may first determine whether the bitmap of the target BT resource is already stored locally. When it is un-stored, the BT client terminal may perform the NOT operation of the bitmap A, and then feed back the new bitmap B obtained through the NOT operation to the peered terminal; when it is stored, the BT client terminal may feed back the locally stored bitmap of the target BT resource to the peered terminal.

It should be understood that the bitmap of the target BT resource stored locally is, in one case, a bitmap of the target BT resource acquired by the BT client terminal in a normal manner, and in another case, a bitmap of the target BT resource predicted by the BT client terminal using a scheme of this embodiment. Therefore, as opposed to the process of directly performing a NOT operation of the bitmap of the peered terminal, the peered terminal may practically obtain the data blocks of the target BT resource from the BT client terminal based on the bitmap acquired by the BT client terminal.

Optionally, when the bitmap of the peered terminal completely covers the locally stored bitmap, the bitmap obtained through the NOT operation may still be fed back, and the corresponding processing may be as follows: when the peered terminal does not store all data slices of the target BT resource that is stored locally, feeding back the bitmap of the target BT resource that is stored locally to the peered terminal, otherwise performing the NOT operation of the bitmap A and feeding back the new bitmap B obtained through the NOT operation to the peered terminal.

In one embodiment, when the BT client terminal stores the bitmap of the target BT resource, after receiving the bitmap A of the target BT resource sent by the peered terminal, the two bitmaps may be compared first. When it is found that the peered terminal does not store all the data slices of the target BT resource that is locally stored, the BT client terminal may feed back the bitmap of the locally stored target BT resource to the peered terminal; and when the bitmap of the peered terminal completely covers the locally stored bitmap, that is, the locally stored data slices of the target BT resource may all be stored at the peered terminal, the BT client terminal may perform a NOT operation of the bitmap A sent by the peered terminal, and then feed back the new bitmap B obtained through the NOT operation to the peered terminal.

It should be noted that when the bitmap of the peered terminal completely covers the bitmap stored locally, and the locally stored bitmap is still fed back to the peered terminal, the peered terminal will not send any data-block acquisition request of the target BT resource to the BT client terminal during the process of the current interaction. As such, the BT client terminal may not be able to further predict the size of the data slice of the target BT resource by using the data-block acquisition request.

In step 103, receiving a data-block acquisition request of the target BT resource sent by the peered terminal.

In one embodiment, during a normal data interaction process of the BT resource, after the two ends exchange their respective bitmaps, when one end finds that the bitmap of the other end contains content that is not included in its own, that is, the other end stores data that the end does not have, the corresponding data blocks may be acquired from the other end. As such, when the BT client terminal feeds back the new bitmap B obtained through the NOT operation to the peered terminal, the peered terminal may consider that the BT client terminal stores data blocks of the target BT resource that are un-stored at the peered terminal. Therefore, the peered terminal may, based on the new bitmap B, send a data-block acquisition request of the target BT resource to the BT client terminal. The BT client terminal may thus receive the corresponding data-block acquisition request.

In step 104, predicting a size of data slice of the target BT resource according to an offset amount in the data-block acquisition request.

In one embodiment, after receiving the data-block acquisition request sent by the peered terminal, the BT client terminal may predict the size of the data slice of the target BT resource according to an offset amount in the data-block acquisition request.

Specifically, certain data bytes of a given data slice that are intended to acquire may be specified in the data-block acquisition request, and the data bytes may be located by an offset amount, i.e., the offset amount may indicate the starting position of the requested data bytes is located at which byte of the data slice. In the meantime, since the size of each data block in the BT resource is a fixed 16 KB, how many data blocks that the data slice at least contains may then be predicted based on the offset amount.

Further, the data of each BT resource is generally divided into a plurality of data slices with a same size. Except for the last data slice, the sizes of the other data slices may be the same. Therefore, the size of the data slice of the target BT resource may be predicted based on the predicted number of the data blocks included in each data slice of the target BT resource.

For example, when the peered terminal requests data bytes in the $20^{th}$ data slice of the target BT resource with an offset amount of 0x8000 and a length of 0x4000, then it may be guessed that one data slice of the target BT resource contains at least (0x8000+0x4000)/0x4000=3 data blocks (the size of one data block is 16 KB, which is 0x4000).

It should be noted that, since the size of the last data slice of the BT resource may be inconsistent with the size of other data slices, the last data slice can be processed separately, that is, the size of the last data slice of the target BT resource may be predicted only based on the offset amount in the data-block acquisition request of the last data slice.

It is worth mentioning that the processing of the above steps 101 to 104 mainly provides a method for predicting the resource information of a BT resource in the case where the metadata of the BT resource cannot be obtained in the normal manner provided in the background technology. Therefore, if the metadata of the BT resource is un-stored in the BT client terminal before performing the step 101, the metadata of the BT resource may be first acquired according to the normal manner described above; however, when the acquisition fails, the resource information of the BT resource can then be predicted according to the method given in steps 101 to 104 according to this embodiment.

Optionally, when predicting the size of the data slice, in the case that the BT client terminal receives a data-block acquisition request with a greater offset amount from the peered terminal, the prediction result may be dynamically updated. Correspondingly, the processing of step 104 may be as follows: when the offset amount in the data-block acquisition request is greater than a known data-block offset amount of the target BT resource, updating the size of the data slice of the target BT resource according to the offset amount in the data-block acquisition request.

During the implementation, after receiving the data-block acquisition request sent by the peered terminal, the BT client may acquire the offset amount carried by the data-block acquisition request, and then compare the offset amount with the known data-block offset amount of the target BT resource. When the offset amount in the data-block acquisition request is greater than the known data-block offset amount of the target BT resource, the BT client terminal may update the size of the data slice of the target BT resource according to the offset amount in the data-block acquisition request.

For example, the known data-block offset amount of the target BT resource at the BT client terminal is 0x8000, the predicted size of the data slice of the target BT resource is 48 KB, and the offset amount in the received data-block acquisition request is 0xc000, which is greater than 0x8000. Therefore, the size of the data slice of the target BT resource can be updated to 64 KB based on the current offset amount 0xc000. Here, the known data-block offset amount of the target BT resource may be predicted by the BT client terminal based on a previous acquisition request for data blocks of target BT resources, and the previous acquisition requests for data blocks may be sent by the peered terminal, or may be sent from other peers to the BT client terminal when the BT client terminal interacts with other peers.

Optionally, after obtaining the BT resource information, the BT client terminal may download the BT resource based on the obtained BT resource information, and the corresponding processing may be as follows: according to the bitmap A and the predicted size of the data slice of the target BT resource, acquiring data blocks of the target BT resource from the peered terminal.

In one embodiment, after predicting the size of the data slice of the target BT resource, the BT client terminal may determine all the data slices of the target BT resource stored at the peered terminal according to the bitmap A, and then further determine all the data blocks of the target BT resources stored at the peered terminal according to the predicted size of the data slice of the target BT resource. Moreover, the BT client terminal may determine the data blocks that are un-stored locally among the data blocks of the target BT resource that are stored at the peered terminal, such that the BT client terminal can acquire these data blocks of the target BT resource that are un-stored locally, but stored at the peered terminal, from the peered terminal.

For example, the target BT resource may actually contain 5 data slices, and the BT client terminal may predict that each data slice contains at least 3 data blocks using the method described above. The bitmap A may be 10110, and the BT client terminal may have stored the three data blocks of each of the first two data slices and the first two data blocks of the third data slice. Therefore, the BT client terminal may determine that the data blocks stored at the peered terminal but un-stored locally are the third data block of the third data slice and the first three data blocks of the fourth data slice. As such, the BT client terminal may acquire these data blocks from the peered terminal by sending a data-block acquisition request to the peered terminal.

Further, in the process of acquiring the data blocks of the target BT resource from the peered terminal, when the BT client terminal updates the size of the data slice of the target BT resource, the BT client terminal may need to re-determine the data blocks stored at the peered terminal and the data blocks stored locally, and then continue to acquire data blocks that are un-stored locally from the peered terminal.

Optionally, a two-dimensional array may be used to record the data storage condition of the BT resource, and the corresponding processing may be as follows: by using a number of the data blocks in each data slice as a length of a first dimension, and a number of the data slices as a length of a second dimension, recording a storage condition of each data block of the local target BT resource in a form of a two-dimensional array.

In one embodiment, when storing the data blocks of the target BT resource, the BT client terminal may use the number of data blocks in each data slice as the length of the first dimension, and the number of data slices as the length of the second dimension, and use a form of the two-dimensional array to record the storage condition of each data block of the local target BT resource.

For example, a, b, c, and d may be used to represent data slices, and 1, 2, 3, and 4 may be used to represent data blocks. Then, a4 may represent the fourth data block of the a-th data slice. The two-dimensional array may thus be (a1, b1, c1, d1), (a2, b2, c2, d2), (a3, b3, c3, d3), (a4, b4, c4, d4). As such, by assigning a Bool-type value to each item in the two-dimensional array, the storage condition of each corresponding data block may be reflected.

Optionally, based on the above processing of using a two-dimensional array to record the storage condition of the data blocks, when the predicted size of the data slice of the target BT resource increases, a new data group may be correspondingly added at the end of the first dimension of the two-dimensional array.

In one embodiment, when the BT client terminal selects a two-dimensional array to record the storage condition of the data blocks of the target BT resource, in the case that the predicted size of the data slice of the target BT resource increases, correspondingly, a new data group may be directly added at the end of the first dimension of the two-dimensional array. For example, an existing two-dimensional array may be (a1, b1, c1, d1), (a2, b2, c2, d2), (a3, b3, c3, d3), (a4, b4, c4, d4), and when the predicted size of the data slice of the target BT resource is increased to 5, correspondingly, a data group (a5, b5, c5, d5) may be added at the end of the first dimension of the two-dimensional array. It can be seen that because the number of the data slices of the BT resource is generally significantly greater than the number of data blocks included in one data slice, the above two-dimensional array record may be selected, and in the process of updating the two-dimensional array, it may not need to traverse all the arrays, thereby saving the usage of memory and CPU.

Figure 2:
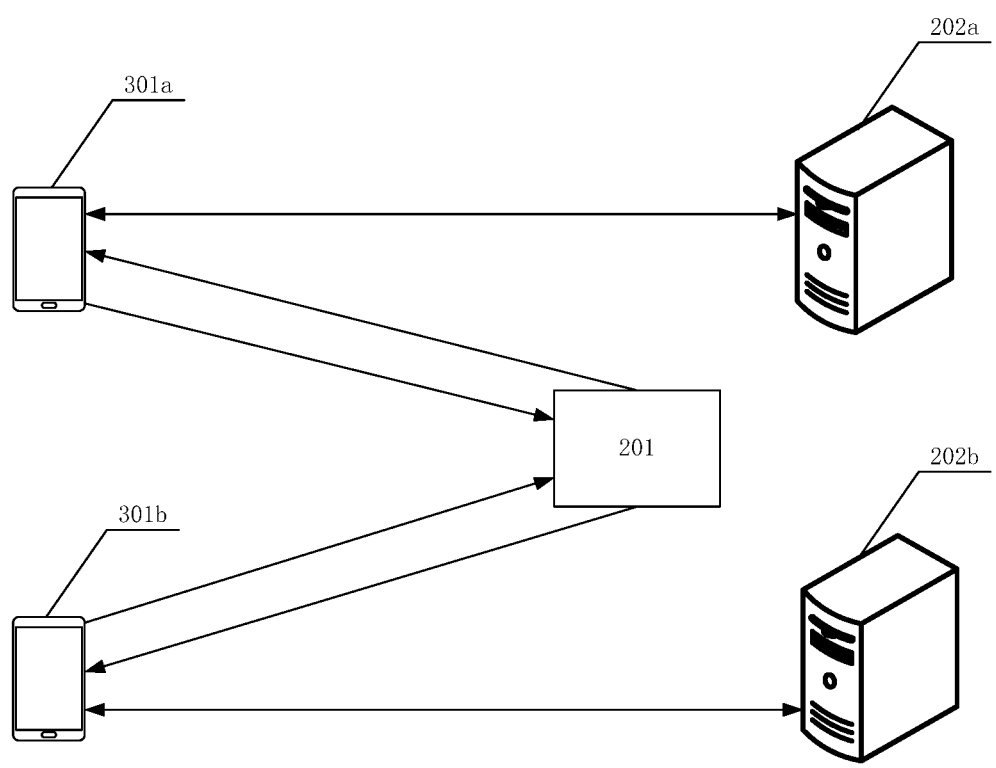
FIG. 2 illustrates a schematic structural diagram of a request response system according to an embodiment of the present disclosure.

The embodiments further provide a method for acquiring BT resource information using a cache server. The cache server may be disposed in a request response system shown in FIG. 2, where the request response system may include a request response device 201 and at least one cache server 202 (indicated by 202a, 202b in the figure), the cache server 202 and the request response device 201 may be connected through a network.

The request response device may be a network export device connected to the peers in the BT system, such as a router or a switch; or may be another independently operated server device connected to the network export device and disposed in the same machine room.

The cache server 202 may be able to communicate with peer 301 (indicated by 301a, 301b in the figure) of the BT system based on the BT protocol.

The peer 301 in the BT system may acquire the BT seed file through network connection, and may parse it based on the BT protocol and obtain a list of tracker servers. A tracker server may be randomly selected, by the peer, and a peer acquisition request may be sent to it. Because the peer acquisition request that the peer 301 sends to the tracker server generally needs to be sent out through a network export device that it is connected to, and then reach the tracker server. After receiving the request, the tracker server may respond, and the response may first reach the network export device and then reach peer 301.

In the present embodiment, the request response device 201 may feed back the access address of the cache server 202 to the peer 301 by responding to the peer acquisition request in advance, such that the peer 301 may, without waiting for the response of the tracker server, quickly acquire the access address of the cache server 202, start the handshake with the cache server 202, and perform the processing of step 101 to step 104. As such, the cache server 202 may be able to, based on the interaction with the peer 301, acquire the BT resource information, and also acquire the data blocks of the BT resource from the peer 301, such that the cache server can automatically enrich the BT resource of the local database from the peers of the BT system, and the BT resources that are maintained by the cache server may not need to be manually maintained. The BT resources in the local database are BT resources with certain user requirements and high popularity, and the value of storing BT resources may be high.

Based on the same technical concept, the embodiments of the present disclosure further provide a device for acquiring BT resource information. A computer program can be executed on the device, and the computer program may be able to implement the method in the embodiments described above.

Optionally, the device may be a cache server.

Those skilled in the art shall understand that the implementation of all or part of the steps of the above embodiments may be completed by hardware, or may be completed by using a program to instruct related hardware. The program may be stored in a computer readable storage medium. The storage medium mentioned above may be a read only memory, a magnetic disk or optical disk, etc.

The above are only the preferred embodiments of the present disclosure, and are not intended to limit the present disclosure. Any modifications, equivalents, improvements, etc., that are within the spirit and scope of the present disclosure, shall be included in the scope of protection of the present disclosure.

What is claimed is:

1. A method for acquiring bit torrent (BT) resource information, comprising:
    after performing a handshake with a peered terminal, receiving a bitmap A of a target BT resource sent by the peered terminal;
    performing a NOT operation of the bitmap A, and feeding back a new bitmap B obtained through the NOT operation to the peered terminal;
    receiving a data-block acquisition request of the target BT resource sent by the peered terminal; and
    predicting a size of data slice of the target BT resource according to an offset amount in the data-block acquisition request.

2. The method according to claim 1, wherein performing the NOT operation of the bitmap A, and feeding back the new bitmap B obtained through the NOT operation to the peered terminal include:
    when a bitmap of the target BT resource is un-stored locally, performing the NOT operation of the bitmap A, and feeding back the new bitmap B obtained through the NOT operation to the peered terminal; and
    when the bitmap of the target BT resource is stored locally, feeding back the bitmap of the target BT resource that is stored locally to the peered terminal.

3. The method according to claim 2, wherein feeding back the bitmap of the target BT resource that is stored locally to the peered terminal includes:
    when the peered terminal does not store all data slices of the target BT resource that is stored locally, feeding back the bitmap of the target BT resource that is stored locally to the peered terminal; and
    when the peered terminal stores all data slices of the target BT resource that is stored locally, performing the NOT operation of the bitmap A and feeding back the new bitmap B obtained through the NOT operation to the peered terminal.

4. The method according to claim 1, wherein predicting the size of the data slice of the target BT resource according to the offset amount in the data-block acquisition request includes:
    when the offset amount in the data-block acquisition request is greater than a known data-block offset amount of the target BT resource, updating the size of the data slice of the target BT resource according to the offset amount in the data-block acquisition request.

5. The method according to claim 1, after predicting the size of the data slice of the target BT resource according to the offset amount in the data-block acquisition request, further including:
    according to the bitmap A and the predicted size of the data slice of the target BT resource, acquiring data blocks of the target BT resource from the peered terminal.

6. The method according to claim 1, further including:
    by using a number of the data blocks in each data slice as a length of a first dimension, and a number of the data slices as a length of a second dimension, recording a storage condition of each data block of the local target BT resource in a form of a two-dimensional array.

7. The method according to claim 6, further including:
    when the predicted size of the data slice of the target BT resource increases, adding a new data group correspondingly to an end of the first dimension of the two-dimensional array.

8. The method according to claim 1, wherein the method is implemented by a cache server.

9. The method according to claim 1, after obtaining the bitmap A of the target BT resource, further including:
    determining a number of data slices included in the target BT resource according to binary digits in the bitmap A.

10. A device for acquiring BT resource information, comprising a computer program, wherein the computer program is executed on the device to implement a method including:
    after performing a handshake with a peered terminal, receiving a bitmap A of a target BT resource sent by the peered terminal;
    performing a NOT operation of the bitmap A, and feeding back a new bitmap B obtained through the NOT operation to the peered terminal;
    receiving a data-block acquisition request of the target BT resource sent by the peered terminal; and
    predicting a size of data slice of the target BT resource according to an offset amount in the data-block acquisition request.

11. The device for acquiring BT resource information according to claim 10, wherein the device is a cache server.

12. The device according to claim 10, wherein the device is further configured to:
    when a bitmap of the target BT resource is un-stored locally, perform the NOT operation of the bitmap A, and feedback back the new bitmap B obtained through the NOT operation to the peered terminal; and
    when the bitmap of the target BT resource is stored locally, feed back the bitmap of the target BT resource that is stored locally to the peered terminal.

13. The device according to claim 12, wherein the device is further configured to:
    when the peered terminal does not store all data slices of the target BT resource that is stored locally, feedback the bitmap of the target BT resource that is stored locally to the peered terminal; and when the peered terminal stores all data slices of the target BT resource that is stored locally, perform the NOT operation of the bitmap A and feedback the new bitmap B obtained through the NOT operation to the peered terminal.

14. The device according to claim 10, wherein the device is further configured to:

when the offset amount in the data-block acquisition request is greater than a known data-block offset amount of the target BT resource, updating the size of the data slice of the target BT resource according to the offset amount in the data-block acquisition request.

15. The device according to claim 10, wherein the device is further configured to:

according to the bitmap A and the predicted size of the data slice of the target BT resource, acquire data blocks of the target BT resource from the peered terminal.

16. The device according to claim 10, wherein the device is further configured to:

by using a number of the data blocks in each data slice as a length of a first dimension, and a number of the data slices as a length of a second dimension, record a storage condition of each data block of the local target BT resource in a form of a two-dimensional array.

17. The device according to claim 10, wherein the device is further configured to:

when the predicted size of the data slice of the target BT resource increases, add a new data group correspondingly to an end of the first dimension of the two-dimensional array.

* * * * *